A. W. BARNARD.
AUTOMATIC WEIGHING SCALE.
APPLICATION FILED JULY 15, 1915.
1,201,917.
Patented Oct. 17, 1916.
2 SHEETS—SHEET 1.
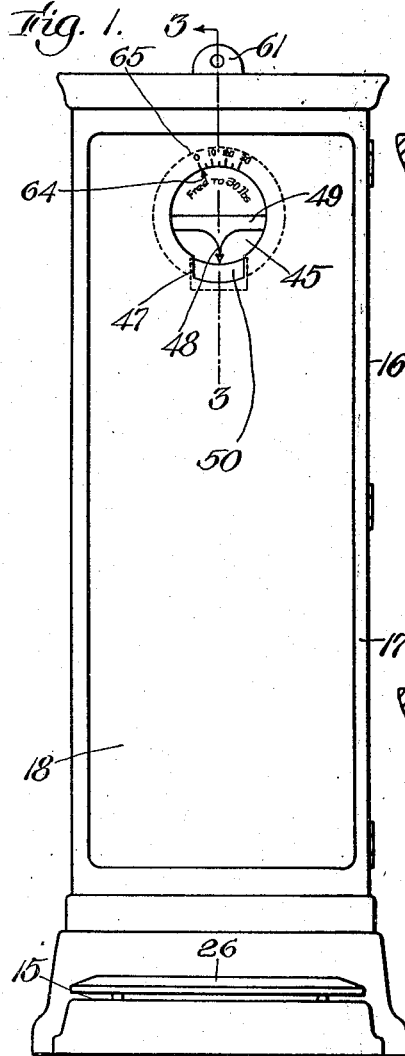
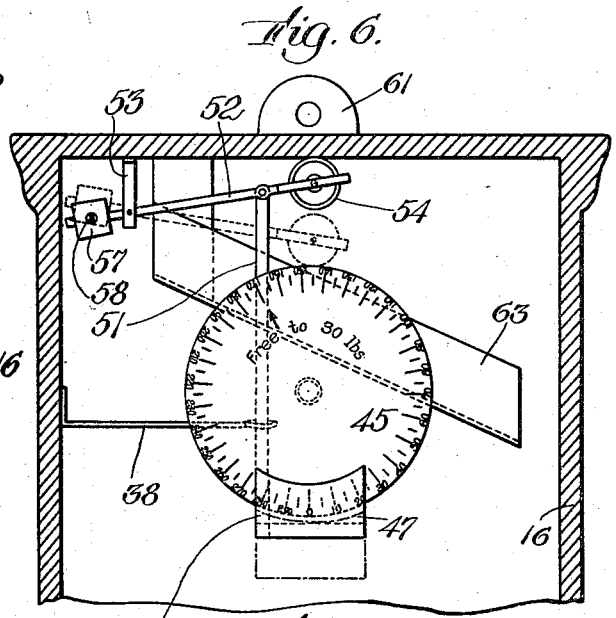
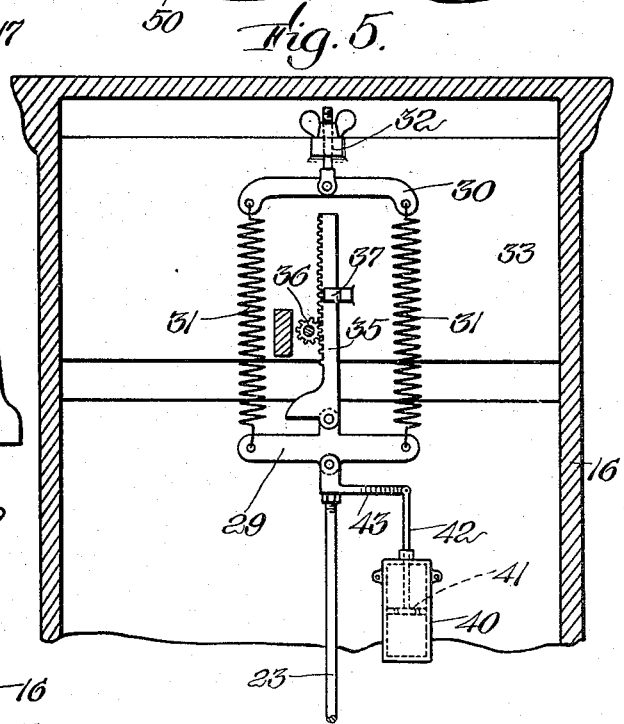
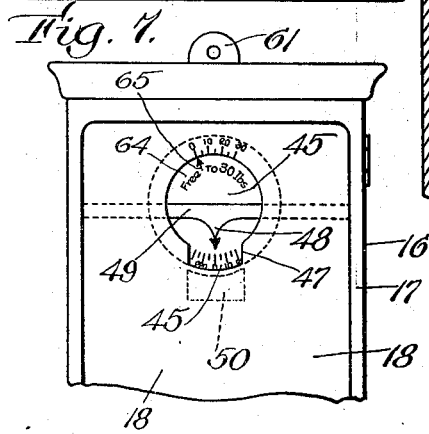
Inventor:
Arthur W. Barnard
By Francis V. Dakin
Attorney.

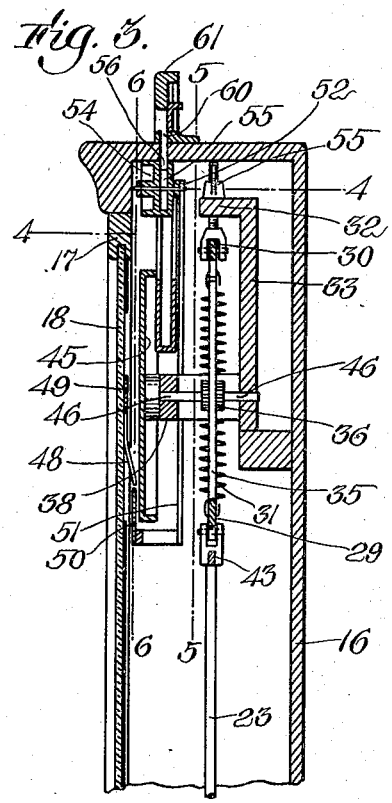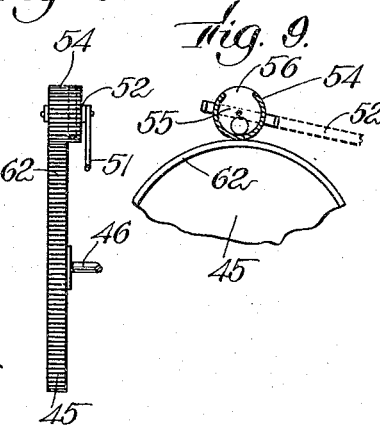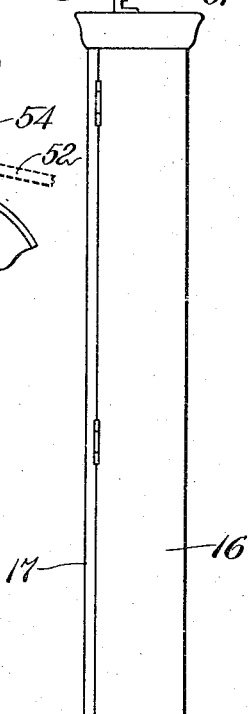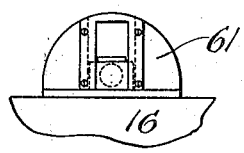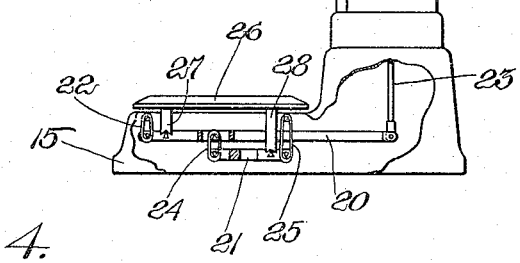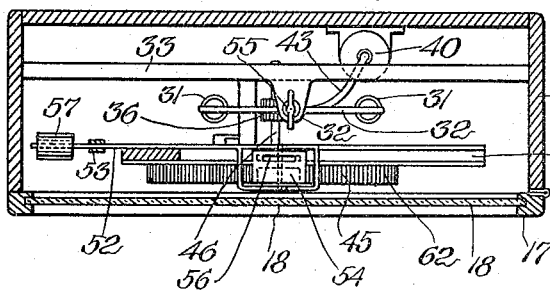

UNITED STATES PATENT OFFICE.

ARTHUR W. BARNARD, OF NEWTON CENTER, MASSACHUSETTS, ASSIGNOR, BY DIRECT AND MESNE ASSIGNMENTS, TO COLONIAL SCALE COMPANY, OF BOSTON, MASSACHUSETTS, A CORPORATION OF MASSACHUSETTS.

AUTOMATIC WEIGHING-SCALE.

1,201,917.   Specification of Letters Patent.   Patented Oct. 17, 1916.

Application filed July 15, 1915. Serial No. 40,121.

*To all whom it may concern:*

Be it known that I, ARTHUR W. BARNARD, a citizen of the United States, residing at Newton Center, in the county of Middlesex and State of Massachusetts, have invented a new and useful Improvement in Automatic Weighing-Scales, of which the following is a specification, reference being had therein to the accompanying drawings.

My invention relates to a coin-operated automatic weighing scale.

In machines of this description it is essential that the machine give but one indication of weight for each coin dropped into the machine in order to prevent the weighing of a number of persons in succession on one coin before the indicating mechanism returns to zero. Various devices have been made to accomplish this result but with the disadvantages that the construction of the machine has been made unduly complicated and expensive and that it is difficult to keep in repair and in operation. It is further desirable that coin-operated automatic scales, which are generally installed in public places, should be capable of giving a limited service free, that is, should give free weighing up to a limited amount, for instance, thirty pounds. This limit permits of the free weighing of children and of parcels and increases the utility of the machine. So far as I am aware no means have so far been devised by which this result can be accomplished by coin-operated automatic scales.

The main object of my invention is to provide a coin-operated automatic scale of simple and efficient construction which will give but one weighing for each coin dropped into the machine.

A further object of the invention is to provide a scale of the character described which can be utilized for free weighing to a limited extent without requiring additional mechanism.

Other and additional objects of the invention will be hereinafter more specifically set forth and described.

Briefly, I accomplish the foregoing objects by providing a scale of any suitable and ordinary construction having a rotary dial operated directly by the weighing mechanism, said dial being suitably marked to indicate weight which is shown by a fixed pointer. The indications on the dial are normally concealed but means are provided whereby when a coin is dropped in the machine, mechanism is set in operation thereby to disclose the markings on the dial for a sufficient space surrounding the fixed pointer to enable one to read the weight indicated. To prevent more than one weighing upon one coin the foregoing means are so constructed that any considerable movement of the dial from the weight indicated causes a return to normal position of the various parts with the result that the markings on the dial are again concealed. In order to secure a further exposure it is then necessary to drop an additional coin into the machine.

In the drawings illustrating the preferred form of my invention as applied to an ordinary form of automatic weighing scale, Figure 1 is a front elevation of an automatic weighing scale constructed and operated in accordance with my invention; Fig. 2 is a side elevation of the same with the base portion of the casing cut away to show the weighing lever mechanism; Fig. 3 is a vertical central sectional view on line 3—3 in Fig. 1 looking from right to left; Fig. 4 is a horizontal sectional view on line 4—4 in Fig. 3 looking downwardly; Fig. 5 is a sectional view on line 5—5 in Fig. 3 looking from left to right and showing the upper portion of the weighing mechanism in elevation; Fig. 6 is a sectional view on line 6—6 in Fig. 3 looking from left to right and showing the dial and coin-operated means for disclosing the weight indicated; Fig. 7 is a front elevation of the upper portion of the scale showing the dial exposed as opposed to Fig. 1 where the dial is shown as concealed; Fig. 8 is a side elevation of the dial and coin roll; Fig. 9 is a front elevation of the coin roll and a portion of the dial, both of said Figs. 8 and 9 showing the coin roll in engagement with the dial; and Fig. 10 is a detail view of the coin slot.

In the drawings illustrating one application of my invention is shown an automatic weighing scale in which the weighing parts of the scale are of well known construction and are inclosed in a casing having a base 15 and an upright portion 16 provided with a hinged door 17 covering the front of the upright portion, said door being preferably provided with a mirror 18 having in its upper portion a circular opening to expose the dial. Within the base of the casing, referring to Fig. 2, are mounted the scale levers consisting of a long lever 20 and a short lever 21. The long lever is supported at its forward end by a link 22 which is in turn supported by a knife edge bearing secured to the base 15 and at its rear end the lever 20 is connected to a steelyard 23. The short lever 21 is connected at its forward end to the long lever 20 by a link 24 and at its rear end by a link 25 to the casing 15. The two levers support a scale platform 26 having a forward bearing 27 resting on the long lever and a rear bearing 28 resting on the short lever. At all points of contact knife edge bearings of usual construction are provided.

The steelyard 23 is pivotally connected at its upper end to a draftbar 29 which is connected to a spring hanger 30 by helical springs 31, the spring hanger being pivotally supported by an adjustable screw 32 in a bracket 33 fastened to the casing 16. Upon the draftbar is pivotally mounted an upright rack-bar 35 held in engagement with a pinion 36 by a guide bracket 37. The pinion carries a dial 45. In order to reduce the vibration of the scale mechanism a dash-pot may be provided comprising a cylinder 40 to hold the oil or other fluid, having a piston 41 and a piston rod 42 which is connected by an arm 43 to the steelyard.

All of the foregoing mechanism is old and well known and does not constitute any part of my invention. Any other suitable weighing mechanism may be substituted for the mechanism hereinbefore described.

The operation of this portion of the scale is well known and may be described briefly as follows: A person desiring to be weighed steps upon the platform 26, which depresses the steelyard 23 through the medium of the levers 20 and 21, the downward movement of the steelyard being opposed by the tension of the springs 31. As the steelyard is depressed, carrying down the draftbar 29 and rack-bar 35, the pinion 36 is turned, rotating the dial and denoting the weight. By regulating the adjusting screw 32 the zero point may be adjusted in correct position and by turning the springs to shorten or lengthen the same, the scale may be adjusted to weigh correctly.

The novel features of my invention reside in the means employed to prevent more than one weighing for each coin dropped into the machine and the means for giving a limited free weighing. In the drawings is shown a dial 45 mounted on the shaft 46 of the pinion 36 and provided with suitable markings around its edge to denote weight. The door 17, as hereinbefore stated, is provided with an opening through which the dial is visible (see Figs. 1 and 7) but said opening is not of sufficient size to expose the markings on the dial except at one place 47 where the door is cut away for this purpose. A pointer 48 carried by a support 49 is fixed in position to indicate the weight shown by the rotary dial when a weight is placed on the scale platform and the pointer is directed to the cut away portion 47 where the markings of the dial are exposed to view.

In order to conceal the weight indicated by the pointer and dial until a coin has been dropped into the machine I provide a movable part or shutter 50 which normally covers and conceals the markings on the dial at and adjacent to the pointer in the cut away portion 47 and which is moved aside to expose the markings on the dial by coin-operated means. Any such means may be provided and one form is shown in the drawings, in which the shutter 50 is carried by a rod 51 moving through a guide rod 38 and mounted on a balanced lever 52 pivotally supported by a depending bracket 53 fastened to the top of the casing 16. On one end of the lever is loosely mounted a coin-roll 54 having a cavity 55 adapted to hold a coin and having an opening 56. A counter-balancing weight 57 is slidably mounted on the other end of the lever 52 and may be held in any adjusted position by a set screw 58. The counter-balancing weight is so adjusted that it is just sufficient to counterbalance the combined weights of the shutter and the coin-roll and to keep the coin-roll in an elevated position as shown in full lines in Fig. 6. In this position the coin-roll is in engagement with the top of the casing 16 (see Fig. 3) and its opening 56 is in alinement with a slot 60 of a coin receiver 61 fastened on the top of the machine.

In the operation of my scale the shutter 50 is normally in a position to conceal the weight indicated by the pointer 48 and the dial. A person desiring to get weighed on the scale steps upon the platform 26 which depresses the scale levers and the steelyard 23 and turns the dial 45 through the medium of the rack-bar 35 and pinion 36 so that as soon as the weighing mechanism comes to a rest, the vibration being reduced by the dash-pot 40, the weight is indicated by the pointer and the dial but remains concealed. At that point the person drops a coin in the receiver 61 which passes through the slot 60 into the coin-roll 54 and the lever 52, being sensitively balanced by the counter-weight 57, the weight of the coin overcomes the weight of the counter-balance and causes the lever 52 to drop until the coin-roll 54 comes into engagement with the edge of the dial, as shown by dotted outline in Fig. 6. The edge of the dial is preferably provided with a flange 62 to increase the friction between the roll and the dial when the two are in engagement. As the coin-roll drops under the weight of the coin, the lever 52 carries with it the rod 51 and shutter 50, thus dropping the shutter and exposing the reading on the dial as shown in Fig. 7. So long as the weight upon the scale platform remains substantially constant and there is no movement of the dial, the parts of the coin-operated means remain in the position last described and the reading on the dial is exposed. If, however, the weight on the scale platform is changed so as to turn the dial an appreciable distance, either by the person stepping off the scale platform or in an attempt to weigh a second person before the dial returns to zero point, the rotation of the dial rotates the coin-roll and when the opening 56 in the coin-roll is turned downwardly, the coin rolls out and falls into a coin-chute 63 and thence into a bag or any other suitable coin receptacle, not shown. As soon as the coin leaves the coin-roll, the counter-balance 57 immediately causes the lever 52 and coin-roll to be elevated again into position shown in full lines in Fig. 6, thus raising the shutter and again concealing the reading on the dial. The amount of movement necessary to accomplish this result is comparatively small and may be regulated to some extent by increasing or decreasing the diameter of the coin-roll. Very little friction between the coin-roll and the flange on the dial is required to effect this result because as the coin-roll is turned by the friction between it and the dial, the coin within rolls and remains in a lowermost position until the opening in the coin-roll reaches its lowermost position when the coin falls out. It will be seen, therefore, that any attempt to weigh more than one person on one coin must necessarily result in a movement of the dial sufficient to discharge the coin and, therefore, conceal the reading on the dial and prevent the attainment of the object sought. It will also be noted that the coin-roll or receptacle is normally out of the path of the indicating means and, therefore, does not interfere with the operation of the indicating means to affect the accuracy of the weight indicated. The coin is not deposited in the coin-receptacle until the weighing mechanism has come to a rest and then the depression of the coin-receptacle into engagement with the indicating means does not have any effect thereon.

By having the weighing mechanism entirely independent of the coin-operated means for disclosing the weight shown on the dial, it becomes possible to provide the scale with auxiliary markings for the purpose of permitting of a limited free weighing. This is an important feature because these scales are generally installed in public places and any service which they can give without charge, such as the weighing of children or light bundles, increases their commercial value. To accomplish this result the dial is preferably provided with an arrow 64 and the front door of the scale is provided with markings 65 running from zero up to the limit of free weight, for instance, thirty pounds, and these markings are at all times exposed to view so that if any object weighing thirty pounds or less is placed upon the scale platform, the movement of the dial, due to that weight, is exposed to view and the weight will be indicated up to the limit by the movement of the pointer 64 marked on the dial. I do not, however, claim herein the structure for giving free weighing to a limited amount in a weighing scale, as this subject matter is set forth and claimed in a divisional application filed by me September 11, 1916, Serial No. 119,397.

It is to be observed that my invention is of great simplicity and is absolutely positive in its action, being operated by force of gravity, and, for all practical purpose it is indestructible and cannot get out of order. It is further so sensitive in its operation that it becomes impossible to weigh more than one person with one coin and secure an indication of more than one weight. The simplicity of the mechanism greatly reduces the cost of manufacture and reduces to a minimum the cost of care and up-keep.

It is to be understood that my invention may be embodied in forms of construction other than that hereinbefore shown and described and I desire to claim the same broadly except where specifically limited in the following claims.

What I claim is:—

1. The combination with a weighing mechanism provided with means for indicating weight, of means for normally concealing the weight shown by said indicating means, and coin-operated means for disclosing the weight shown, said coin-operated means comprising a movable coin-receptacle normally out of the path of said indicating means and adapted whenever actuated to be moved by the weight of a coin into engagement with said indicating means.

2. The combination with a weighing mechanism provided with means for indicating weight, of means for normally concealing the weight shown by said indicating means, and coin-operated means for moving said concealing means to disclose the weight indicated, said coin-operated means comprising a movable coin-receptacle normally out of the path of said indicating means and adapted whenever actuated to be moved by the weight of a coin into engagement with said indicating means.

3. The combination with a weighing mechanism provided with means for indicating weight, of means for normally concealing the weight shown by said indicating means, and means normally out of the path of said indicating means and operated by the weight of a coin for moving said concealing means to disclose the weight shown by said indicating means; said means being so arranged that any movement of said indicating means in either direction releases said coin and permits said concealing means to return to its normal position.

4. The combination with a weighing mechanism provided with means for indicating weight, of means for normally concealing the weight shown by said indicating means, and means operated by the weight of a coin for moving said concealing means to disclose the weight indicated, said means being normally out of the path of said indicating means but so arranged that when operated by the coin any movement of the indicating means in either direction releases said coin and permits said concealing means to return to normal position.

5. The combination with a weighing mechanism provided with means for indicating weight, said means being normally concealed, of coin-operated means for disclosing the weight indicated, said coin-operated means comprising a movable coin-receptacle normally out of the path of said indicating means and adapted whenever actuated to be moved by the weight of a coin into engagement with said indicating means whereby any movement of said indicating means ejects the coin from said receptacle and permits the coin-operated means to return to normal position.

6. The combination with a weighing mechanism provided with means for indicating weight, said means being normally concealed, of means operated by the weight of a coin for disclosing the weight indicated, said means being normally out of the path of said means for indicating weight but so arranged that when operated by a coin any movement of the indicating means releases said coin and permits said coin-operated means to return to normal position.

7. The combination with a weighing mechanism provided with a dial, normally concealed, of coin-operated means for disclosing the weight indicated by said dial, said coin-operated means comprising a movable coin-receptacle normally out of the path of said dial and adapted whenever actuated to be depressed by the weight of a coin into engagement with said dial.

8. The combination with a weighing mechanism provided with a normally concealed dial of means normally out of the path of said dial and operated by the weight of a coin for disclosing the weight shown by said dial; said means being so arranged that when operated by a coin any movement of the dial releases said coin and permits said means to return to a normal position to conceal the dial.

9. The combination with a weighing mechanism having a dial normally concealed, of means normally out of the path of said dial and adapted to be operated by the weight of a coin for exposing the weight indicated by said dial; said means being so arranged that when operated by the weight of a coin to disclose the weight indicated any movement of the dial in either direction releases said coin thereby permitting said coin-operated means to return to a normal position and the dial to be concealed.

10. The combination with a weighing mechanism, of a rotary dial, means for normally concealing the weight indicated by said dial, and coin-operated means for disclosing the weight indicated by said dial, said coin-operated means comprising a movable coin-receptacle adapted when actuated to be moved by the weight of a coin into engagement with said dial whereby any movement of said dial rotates said coin-receptacle to eject the coin therefrom and to allow the coin-operated means to return to normal position.

11. The combination with a weighing mechanism, of a rotary dial, a fixed pointer for indicating weight on said dial, means for normally concealing the weight indicated by said pointer, and coin-operated means for disclosing the weight indicated, said coin-operated means comprising a movable coin-receptacle adapted whenever actuated to be moved by the weight of a coin into engagement with said dial whereby any movement of said dial rotates said coin-receptacle to eject the coin therefrom and to allow the coin-operated means to return to normal position.

12. The combination with a weighing mechanism, of a rotary dial, a fixed pointer for indicating weight on said dial, a shutter for normally concealing the weight indicated by said pointer and dial, and coin-operated means for moving said shutter to disclose the weight indicated, said coin-operated means comprising a movable coin-receptacle adapted whenever actuated to be moved by the weight of a coin into engagement with said dial whereby any movement of said dial rotates said coin-receptacle to eject the coin therefrom and to allow the coin-operated means to return to normal position.

13. The combination with a weighing mechanism, of a rotary dial, a fixed pointer for indicating weight on said dial, a shutter for normally concealing the weight indicated by said pointer and dial, coin-operated means for moving said shutter to disclose the weight indicated, and means operated by the movement of said dial to return said shutter to its normal position, said coin-operated means comprising a movable coin-receptacle adapted whenever actuated to be moved by the weight of a coin into engagement with said dial whereby any movement of said dial rotates said coin-receptacle to eject the coin therefrom and to allow the coin-operated means to return to normal position.

14. An indicating mechanism for coin-operated automatic weighing scales comprising a rotary dial, movable means for normally concealing the weight indicated by said dial, coin-operated means for moving said movable means to disclose the weight indicated, and means whereby any movement of said dial from the weight indicated permits the return of said movable means to its normal position, said coin-operated means comprising a movable coin-receptacle adapted whenever actuated to be moved by the weight of a coin into engagement with said dial whereby any movement of said dial rotates said coin-receptacle to eject the coin therefrom and to allow the coin-operated means to return to normal position.

15. The combination with a weighing mechanism, of a rotary dial, means for normally concealing the weight indicated by said dial, coin-operated means for disclosing the weight indicated by said dial, and means to return the said concealing means to its normal position whenever there is a change in the position of the indicating mechanism after a weight has been registered, said coin-operated means comprising a movable coin-receptacle adapted whenever actuated to be moved by the weight of a coin into engagement with said dial whereby any movement of said dial rotates said coin-receptacle to eject the coin therefrom and to allow the coin-operated means to return to normal position.

16. The combination with a weighing mechanism provided with a dial normally concealed of coin-operated means for disclosing the weight indicated by said dial; said means comprising a rotary coin-receptacle adapted to be depressed by the weight of a coin into engagement with said dial so as to be rotated by said dial to discharge the coin and a shutter operating in unison with said coin-receptacle.

17. The combination with a weighing mechanism provided with a dial normally concealed of coin-operated means for disclosing the weight indicated by said dial; said means comprising a balanced lever, a coin-receptacle rotatably mounted on one end of said lever and normally out of the path of said dial and adapted to be depressed by the weight of a coin into engagement with said dial and a shutter carried by said balanced lever.

18. The combination with a weighing mechanism provided with a normally concealed dial of means for disclosing the weight indicated by said dial so long as there is no change in said indication; said means comprising a lever, a coin-receptacle rotatably mounted on one end of said lever, a counter-weight on the other end of said lever to maintain said coin-receptacle in an uppermost position except when a coin is dropped into said receptacle to cause it to engage said dial and a shutter operated by said lever to disclose the weight indicated by said dial when said coin-receptacle is depressed.

19. The combination with a weighing mechanism provided with a normally concealed dial of means for disclosing the weight indicated by said dial so long as there is no change in said indication; said means comprising a movable rotary coin-receptacle adapted to be depressed by the weight of a coin into engagement with said dial so as to be rotated by said dial to discharge the coin and a shutter operating in unison with said coin-receptacle to disclose the weight when the said coin-receptacle is depressed.

20. The combination with a weighing mechanism provided with a rotary dial normally concealed of coin-operated means for disclosing the weight indicated by said dial; said means comprising a rotatable coin-roll normally out of the path of said rotary dial and provided with a single opening for both receiving the coin and for discharging said coin when the roll is rotated.

21. The combination with a weighing mechanism provided with a rotary dial normally concealed of coin-operated means for disclosing the weight indicated by said dial; said means comprising a movable and rotatable coin-roll normally out of the path of said rotary dial and provided with a single opening for both receiving and discharging a coin, and adapted to be depressed by the weight of a coin into engagement with said dial so that any movement of said dial rotates said coin-roll to discharge the coin and permits said parts to return to their normal position.

22. In a coin-controlled apparatus of the character described, an operating element, coin-controlled means operatively associated therewith including a rotatable coin-receiving element normally out of the path of said operating element, one of said elements being mounted for movement relative to the other of said elements and adapted to effect engagement therebetween upon the insertion of a coin whereby rotation of the coin-receiving element under subsequent relative movement of the elements will release the coin.

23. In a coin-controlled apparatus of the character described, a movable rotating part, and a coin-controlled element operatively associated therewith including a rotatable coin receiver normally out of the path of said rotating part and mounted for movement relative to said movable part and adapted upon the insertion of a coin to be moved into engagement with said movable part to effect subsequent rotation of said coin-receiver by the movement of said movable part to release the coin.

24. In a device of the character described, indicating means normally concealed, coin-operated means for exposing the indication including a coin-controlled element normally out of the path of said indicating means and adapted upon engagement by a coin to move into operating contact with a movable part of the indicator at each actuation of the device whereby the subsequent movement of said part will effect the release of the coin.

25. In a device of the character described, indicating means normally concealed, coin-operated means for exposing the indication including a coin-controlled element normally out of the path of said indicating means and adapted upon engagement by a coin to move into operating contact with a movable part of the indicator at each actuation of the device whereby the subsequent movement of said part will effect the release of the coin, and means for automatically restoring the parts to their normal position when the coin is released.

26. In a device of the character described, indicating means normally concealed, coin-operated means for exposing the indication including a coin-controlled element adapted upon engagement by a coin to move into operating contact with a movable part of the indicator at each actuation of the device whereby the subsequent movement of said part will effect the release of the coin, and a shutter connected and arranged to move in consonance with the movement of the coin-controlled element, the movement of the shutter being limited by the engagement of said coin-controlled element with said movable part of the indicator.

In testimony whereof, I hereunto set my hand in the presence of two subscribing witnesses, this the ninth day of July, 1915.

ARTHUR W. BARNARD.

Witnesses:
F. J. V. DAKIN,
E. F. UNIAC.

Copies of this patent may be obtained for five cents each, by addressing the "Commissioner of Patents, Washington, D. C."